Aug. 9, 1966 B. PFROMMER 3,264,846
DOUBLE FACED KNITTED FABRIC
Filed Nov. 13, 1964 13 Sheets-Sheet 2

Inventor:

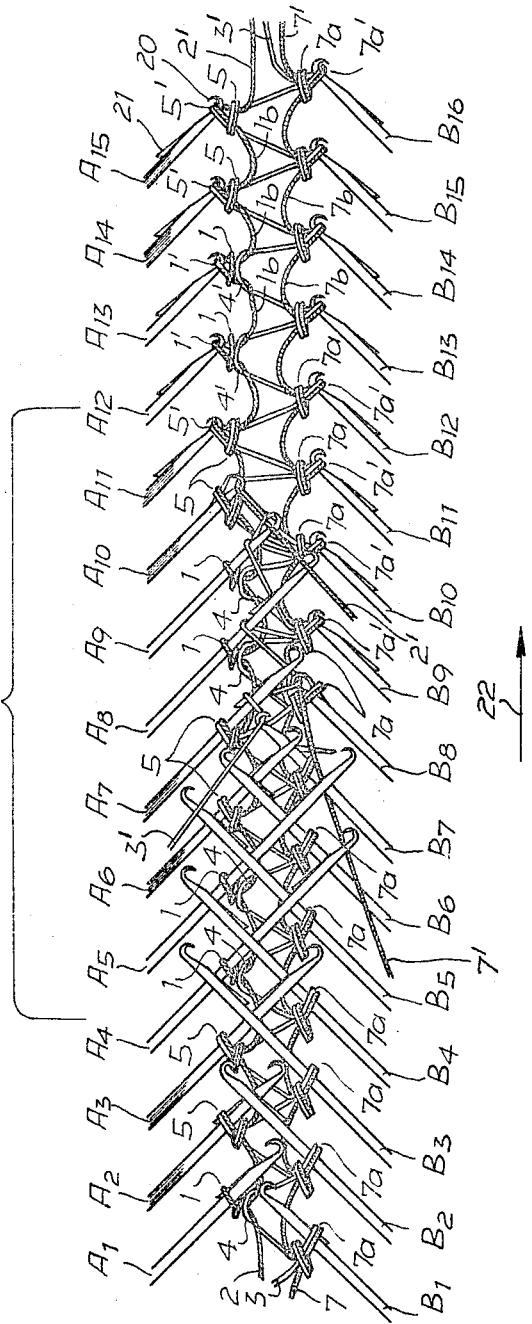

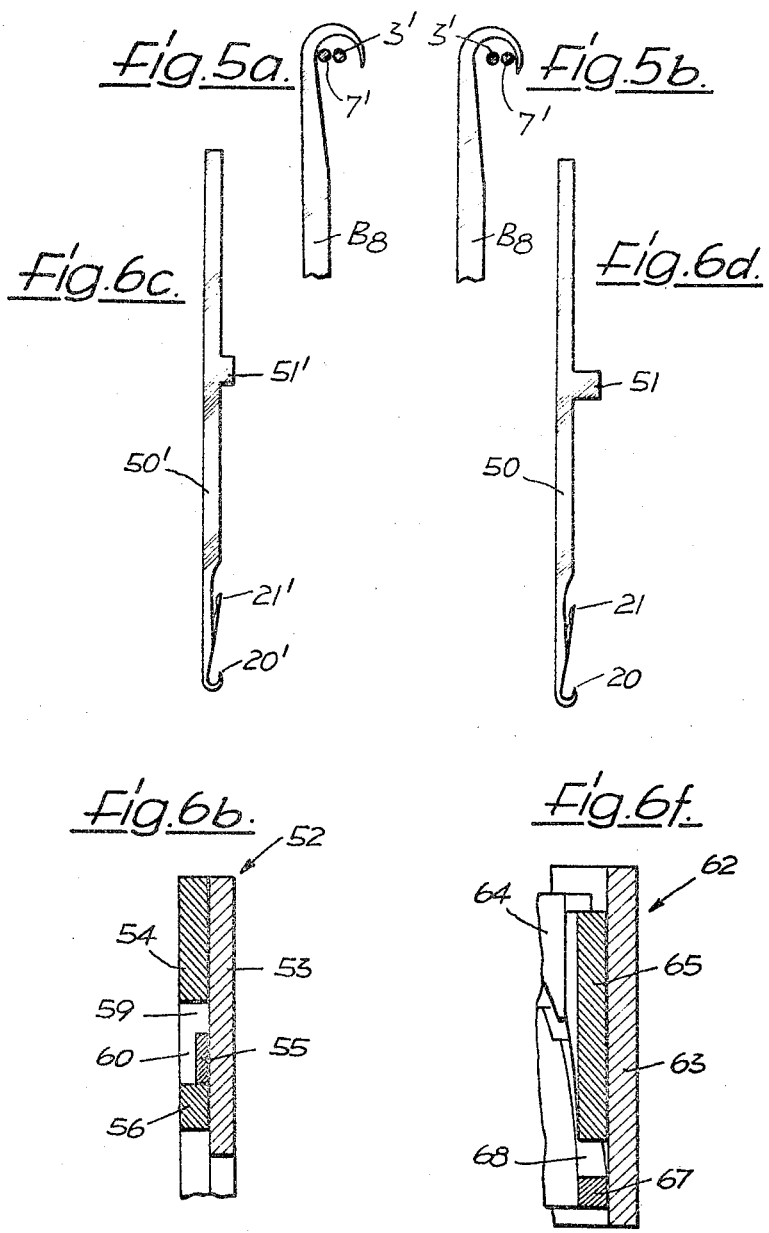

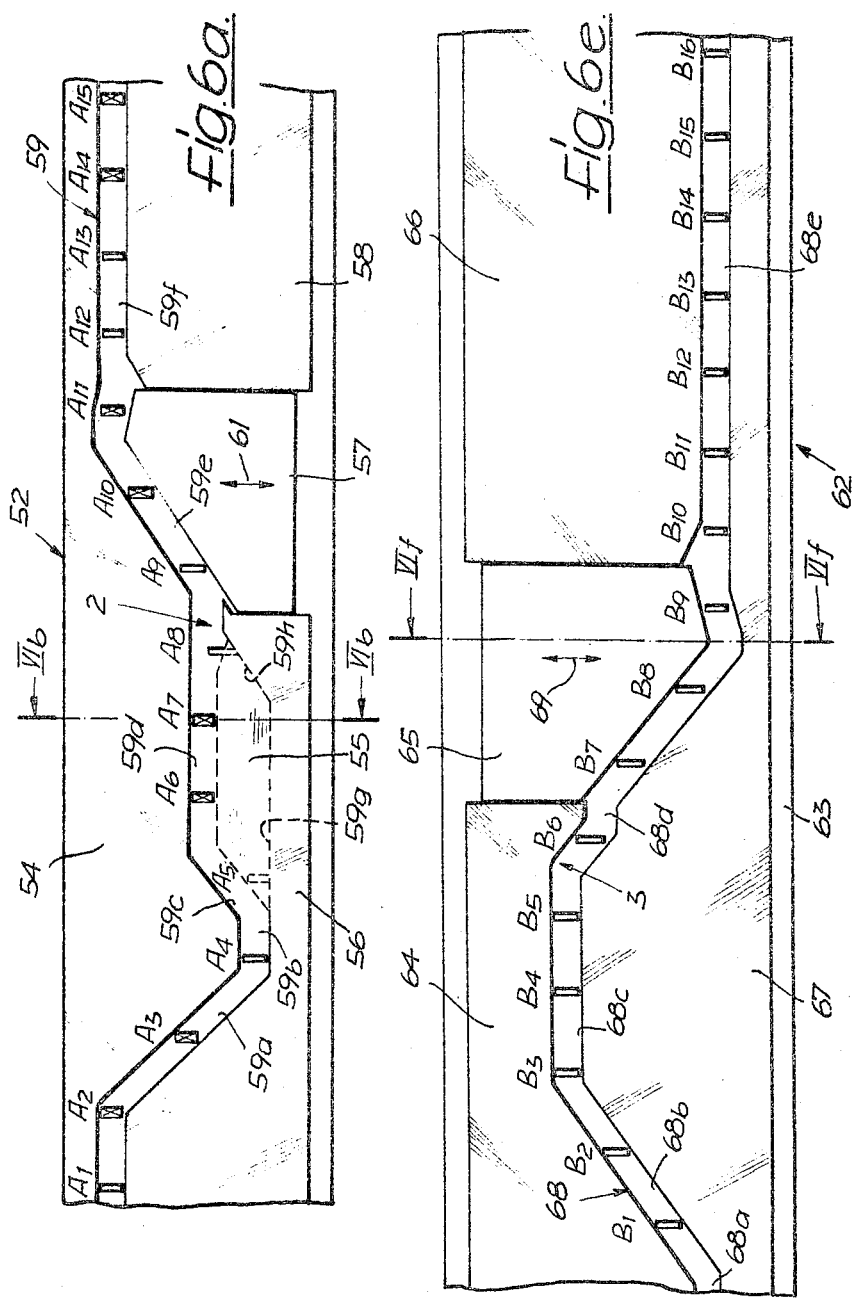

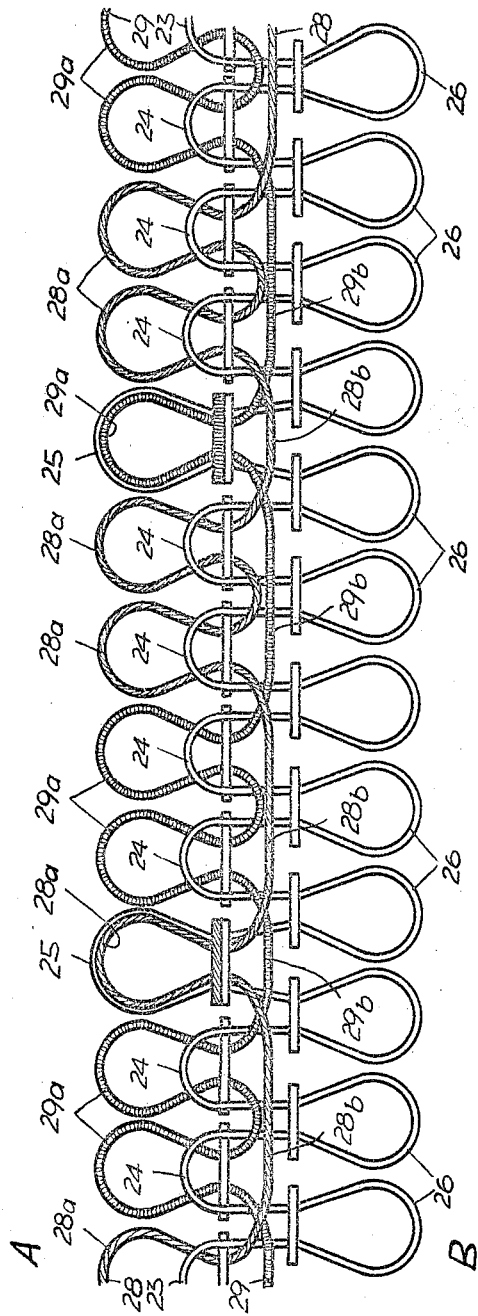

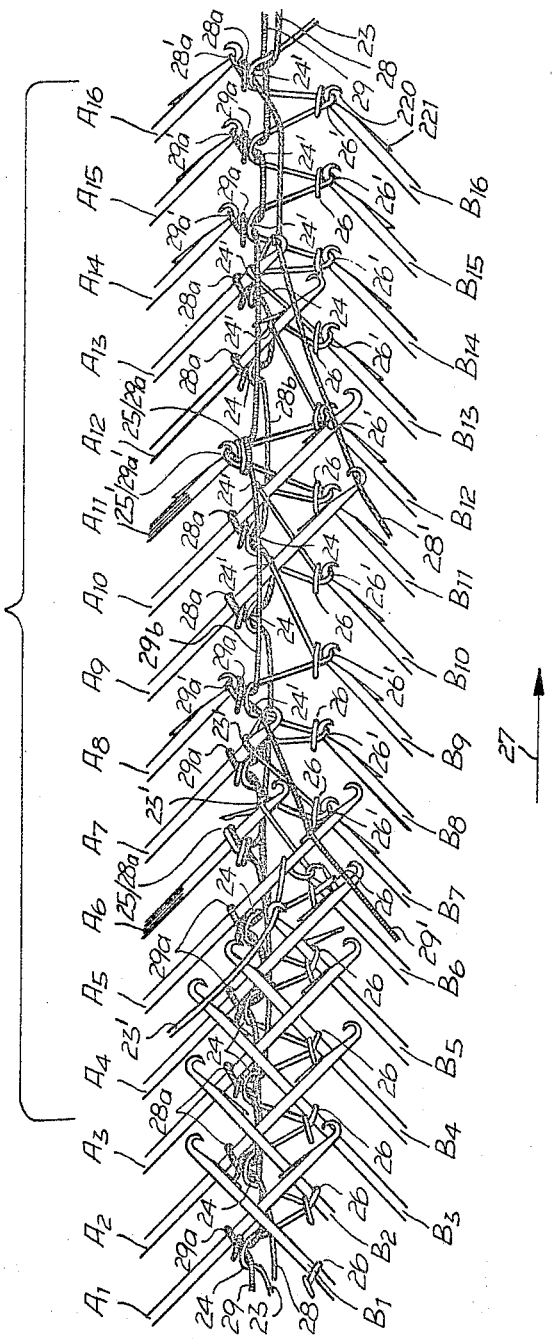

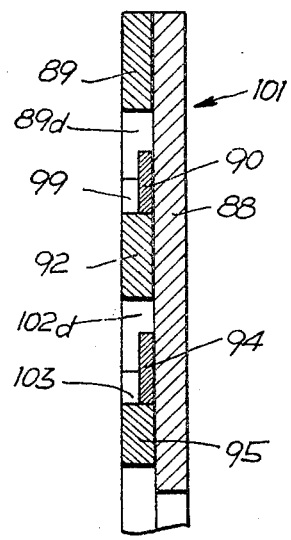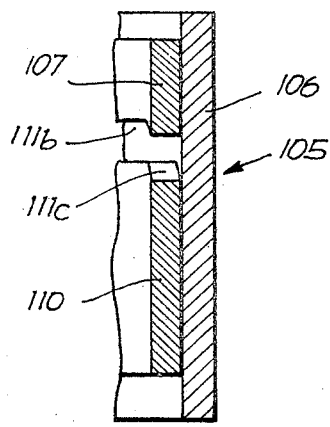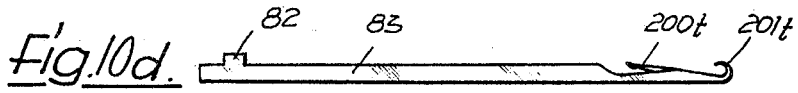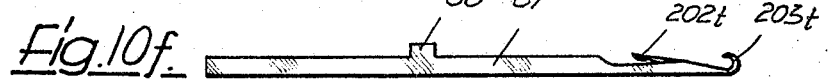

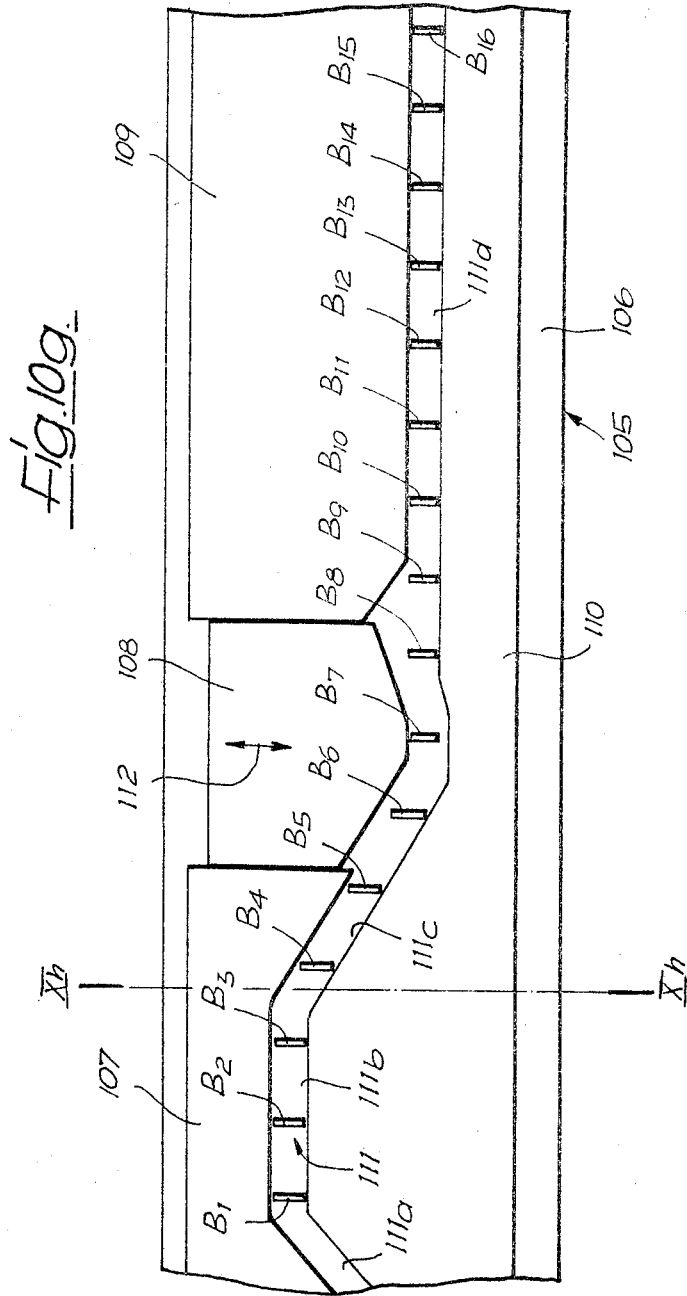

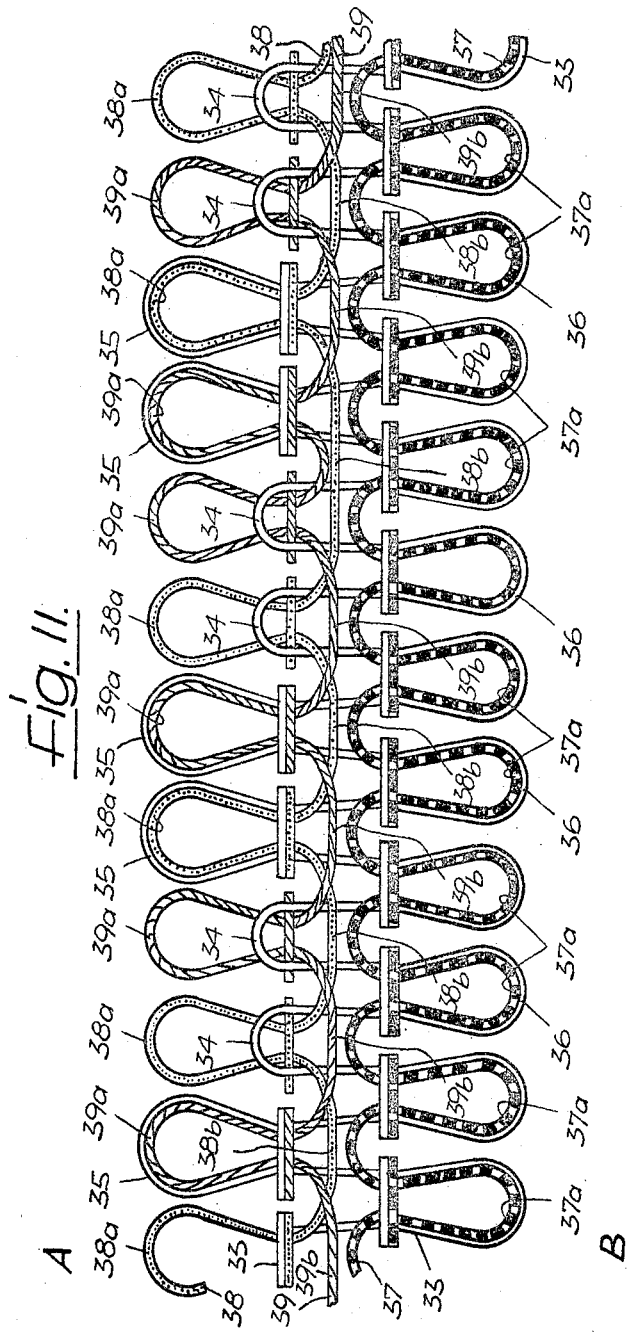

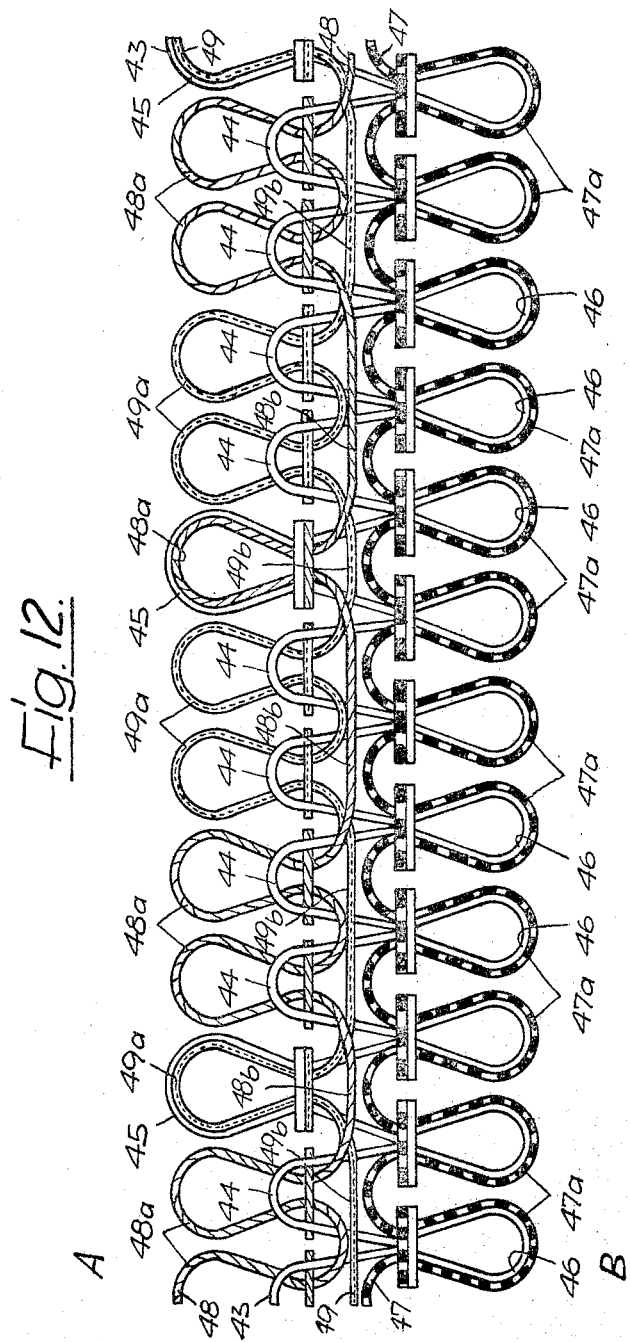

United States Patent Office 3,264,846
Patented August 9, 1966

3,264,846
DOUBLE FACED KNITTED FABRIC
Bruno Pfrommer, Tuebinger Strasse 51,
Reutlingen, Germany
Filed Nov. 13, 1964, Ser. No. 410,943
Claims priority, application Germany, Feb. 20, 1960,
P 24,476
9 Claims. (Cl. 66—196)

This is a continuation-in-part application to application Serial No. 89,188, filed Feb. 14, 1961, now abandoned.

The present invention relates to a double-faced knitted fabric which can be produced, for example, on a circular knitting machine.

More particularly, the present invention relates to a double-faced knitted fabric, wherein on each side ground loops are formed by means of corresponding threads and both sides are connected by one of the two threads, which is the binding thread.

In known fabrics of this type, as long as it is not, as in the case of the present application, an interlocking fabric, the connection of the two sides of the fabric is brought about such, that the binding thread forms plain loops, which means that loops are formed by the binding thread on both sides of the fabric. It is already known, however, to bind the two sides of a fabric by means of tuck loops only. Such known fabrics are on each side of one color only.

If a double-faced fabric is multi-colored on one or both sides, it is an interlocking fabric in which each of two threads, at least present, occurs on both sides of the fabric and forms stripes extending in the direction of the wales, if the threads are of different appearance, or it is a fabric, which can be produced only by means of a particular pattern. In the latter case, a fabric is produced, wherein one thread, which forms ground loops on one side of the fabric, is pulled to the other side of the fabric at some points and forms these loops, whereby at those points, the thread, which otherwise forms the loops of the other side of the fabric, lies free or forms double loops with the thread pulled over from the other side of the fabric.

It is, therefore, one object of the present invention to provide a double-faced knitted fabric, in which at least on one side of the fabric a pattern can be formed, without requiring a knitting machine with a particular pattern device, which fabric can be produced rather with the known means of a circular knitting machine, for instance such, that needles with different feet and a corresponding channel formation are used in the locks of the circular knitting machine, whereby from the following description of the fabric according to the present invention it is obvious for the expert, how these known means are to be applied.

It is another object of the present invention to provide a double-faced knitted fabric, which comprises at least two threads, of which the first thread forms ground loops on a first side of the fabric, the second thread forms ground loops on the second side of the fabric, and whereby one of the two threads connects the two sides of the fabric, by forming tuck loops, on that side of the fabric on which it does not form ground loops, the tuck loops being suspended over the ground loops of this side of the fabric, and by forming plain loops, which form double loops with the ground loops of this side of the fabric, whereby the tuck loops and the plain loops are formed in any desired pattern.

By this arrangement, the binding thread appears on the outside on one side of the fabric there, where plain loops are formed by it, supposing that the binding thread is disposed in the double loops, which contain the plain loops, lies on the outside of the fabric, and the ground loops of the other thread appear there, where tuck loops are formed by the binding thread. This can be obtained in any pattern, and this pattern is brought about, with binding the loops, which are not formed of the binding thread, by means of the binding thread at any place of the fabric.

The pattern results, if the binding thread has a different color or a different quality than the other thread or threads.

First of all the fabric according to the present invention has the advantage in its simplest form, that it can form a framing for a great number of other fabrics, which offer further pattern possibilities and which can be produced in a simple manner by formation on the base of this framing.

The preferred pattern of the fabrics according to the present invention is the provision of stripes, which are disposed in the direction of the wales, whereby groups of a plurality of adjacently disposed wales appear different. These stripes can be interrupted by courses of loops of equal or unequal appearance relative to each other, from which it appears that the fabric according to the present invention can have also checks.

With these and other objects in view, which will become apparent in the following detailed description, the present invention will be clearly understood in connection with the accompanying drawings, in which:

FIG. 3 shows a section of a variation of a fabric as shown in FIGS. 1 and 2;

FIG. 5 shows a diagrammatic and perspective representation of the method for producing a fabric as shown in FIGS. 3 and 4;

FIGS. 5a and 5b show parts of cylinder needles and the possibilities of feeding two threads into the hooks of the needles;

FIGS. 6a and 6e show diagrammatic representations of the lock constructions of the rib disc and of the cylinder, respectively, of a circular knitting machine adapted to produce a fabric as shown in FIGS. 3 and 4 and to perform the method as diagrammatically represented in FIG. 5;

FIG. 6b shows a cross-section taken along the lines VIb—VIb of FIG. 6a;

FIG. 6c shows a knitting needle with a low foot;

FIG. 6d shows a knitting needle with a high foot;

FIG. 6f shows a cross-section taken along the lines VIf—VIf of FIG. 6e;

FIG. 7 shows a section of a second embodiment of a fabric according to the present invention;

FIG. 9 shows a diagrammatic and perspective representation of the method for producing a fabric as shown in FIGS. 7 and 8;

FIGS. 10a and 10g show diagrammatic representations of the lock constructions of the rib disc and of the cylinder, respectively, of a circular knitting machine adapted to produce a fabric as shown in FIGS. 7 and 8 and to perform the method as diagrammatically represented in FIG. 9;

FIG. 10b shows a cross-section taken along the lines Xb—Xb of FIG. 10a;

FIGS. 10c and 10d show a high foot needle and a low foot needle, respectively, of one sort;

FIGS. 10e and 10f show a high foot needle and a low foot needle, respectively, of another sort;

FIG. 10h shows a cross-section taken along the lines Xh—Xh of FIG. 10g;

FIG. 11 shows a section of a variation of a fabric as shown in FIGS. 7 and 8; and FIG. 12 shows a section of a further variation of a fabric as shown in FIGS. 7 and 8.

Figure 1:
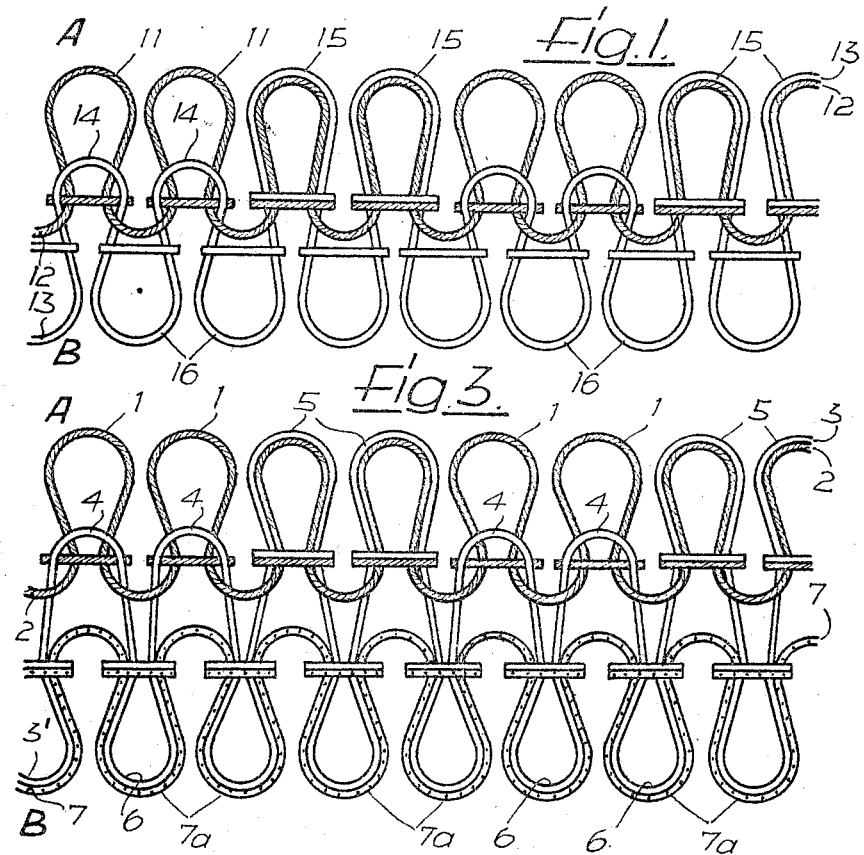
FIGURE 1 shows a section of the simplest form of the fabric according to the present invention.
Figure 2:
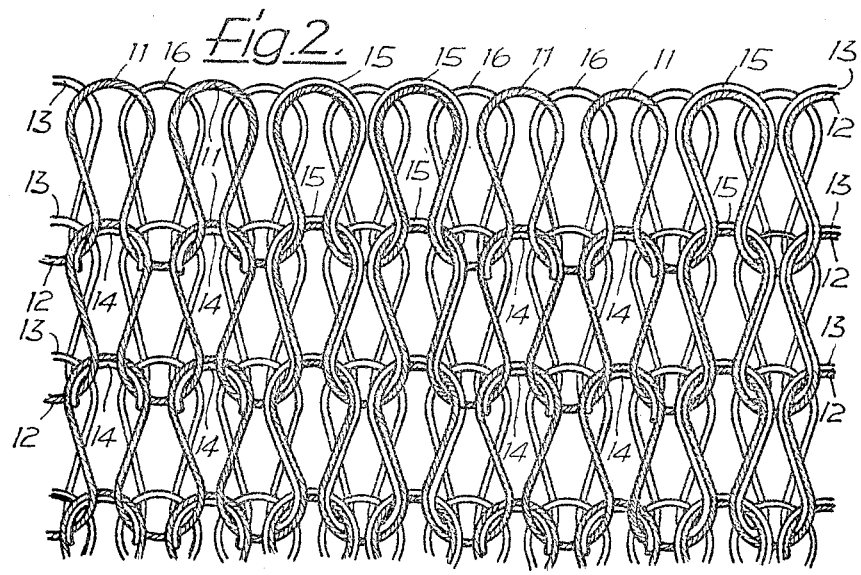
FIG. 2 shows a view of the fabric as shown in FIG. 1.

Referring now to the drawings, and in particular to FIGS. 1 and 2, a section and a face view, respectively, of the simplest form of a double-faced knitted fabric according to the present invention are shown which fabric is provided on one side A with ground loops 11 which are formed of a thread 12. The binding thread 13 forms ground loops 16 on the other side B, which hang on the ground loops 11 of the thread 12 by means of tuck loops 14. Furthermore, the binding thread 13 forms plain loops 15 which together with ground loops 11 result in double loops adapted to form stripes on the face A of the fabric running on the direction of the wales.

The tuck loops 14 and plain loops 15 may occur in any desired pattern on the side A. Thus pluralities of subsequent courses provided each with plain loops 15 may alternate with courses or pluralities of subsequent courses not provided with plain loops 15, so that the wales containing plain loops 15 may be interrupted by one or several courses of uniform appearance, because the tuck loops 14 are not to be seen on the side A.

Figure 4:
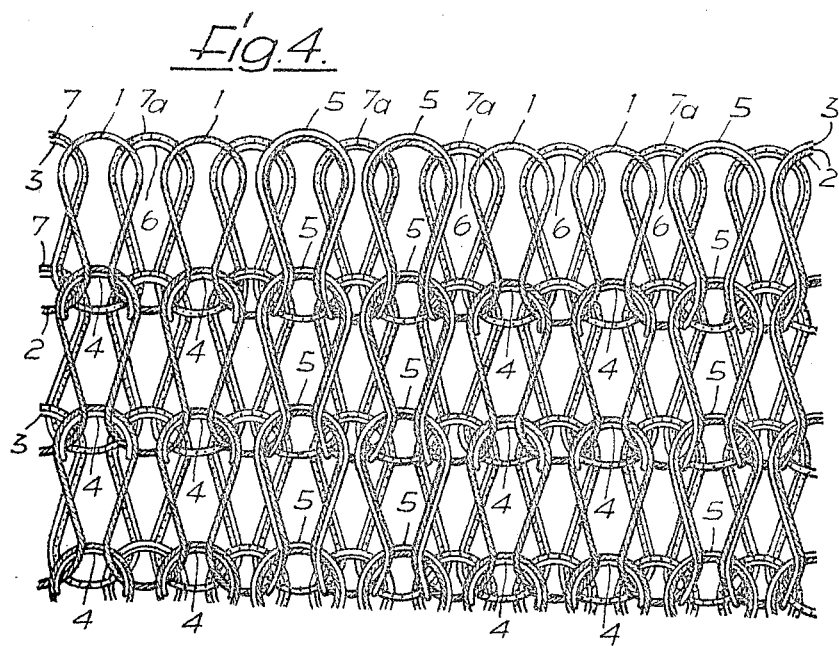
FIG. 4 shows a view of the fabric as shown in FIG. 3.

The method and means for manufacturing the fabric as shown in FIGS. 1 and 2 will be described below in connection with the specification of the method and means for manufacturing a fabric as shown in FIGS. 3 and 4.

FIGS. 3 and 4 show two fabrics which are quite similar to the fabric disclosed in FIGS. 1 and 2, except that the side B is plated by a third thread 7 which forms ground loops 7a on the ground loops 6 of the binding thread 3.

In the fabric, according to the section shown in FIG. 3 and to the face view shown in FIG. 4, the third thread 7 lies above the binding thread 3, when seen from the outside. Thus on the side B stripes extending in the direction of wales may be produced which may be interrupted by courses of uniform appearance in which either ground loops 6 formed by the binding thread 3 or ground loops 7a formed by the third thread 7 lie on the surface of the side B.

The wales $a$ and $b$, several of which may be knitted immediately adjacent to each other, may be arranged independently of how the kinds of loops are arranged on the other side of the fabric.

The method and means for manufacturing a fabric as shown in FIGS. 3 and 4 will now be described on the hand of FIGS. 5 and 6a to 6e, and it is noted that the manufacture of a fabric as shown in FIGS. 1 and 2 is the same with the exception that feeding of the thread 7 is omitted.

FIG. 5 shows schematically the method for manufacturing a fabric, as shown in FIGS. 3 and 4 on a circular knitting machine having a direction of rotation of the cylinder and of the plate in the direction of the arrow 22, whereby in FIG. 5 the needles are disclosed unwound from the periphery of the cylinder and of the plate and the individual loops are spread apart, in order to clarify the showing.

FIG. 6a shows the plane view from the top of the lock of a system of the plate of the circular knitting machine, whereby the upper part of FIG. 6a is at that side of the lock, which is pointing to the axis of the knitting machine.

FIG. 6b shows a section through the lock along the lines VIb—VIb of FIG. 6a.

FIG. 6e shows the unwound inner view of the lock of a system of the cylinder of the circular knitting machine and FIG. 6f is a section through the lock along the lines VIf—VIf of FIG. 6e.

FIG. 6c discloses the low foot needle with its needle shaft 50′, the lower foot 51′, the hook 20′ and the flap 21′. FIG. 6d indicates a high foot needle having a needle shaft 50, a high foot 51, a hook 20 and a flap 21.

The section of the fabric shown in FIG. 3 discloses ground loops 1 formed of the thread 2 on the side A of the fabric, furthermore tuck loops 4 on the side A of the fabric formed of the binding thread 3, plain loops 5 extending over both sides of the fabric, ground loops 6 disposed on the side B of the fabric and finally, ground loops 7a made of metal-covered thread 7 and disposed on the side B of the fabric. The plain loops 5 and 6 form jointly with the loops 1 and the loops 7a double-thread loops and other ground loops 7a form with the ground loops 6 likewise double-thread loops.

FIG. 5 shows now, how such fabric, as disclosed in FIGS. 3 and 4, is produced. Of the plate needles $A_1$ to $A_{15}$, the needles $A_2$, $A_3$, $A_6$, $A_7$, $A_{10}$, $A_{11}$, $A_{14}$ and $A_{15}$ are high foot needles in accordance with FIG. 6d, which are emphasized in the drawing by shading, while the needles $A_1$, $A_4$, $A_5$, $A_8$, $A_9$, $A_{12}$ and $A_{13}$ are low foot needles in accordance with FIG. 6c. The low foot needles are symbolically shown in FIG. 6a by a rectangle, while the high foot needles are shown symbolically by a rectangle with a cross disposed therein.

FIG. 5 shows the fabric on the needles in a predetermined state. This showing is to be understood such, that the needles are moved in the direction of the arrow 22 together with the fabric to be produced, whereby the needles are controlled by the immovable locks in accordance with FIGS. 6a and 6e. For instance, the low foot needle $A_1$ assumes succesively the positions of the low foot needles $A_4$, $A_5$, $A_8$, $A_9$ $A_{12}$, $A_{13}$, etc. and in the individual positions the fabric element held by the needle $A_1$ is worked further such, as it is shown for the following low foot needles. Correspondingly, the high foot needle $A_2$ assumes successively the positions of the high foot needles $A_3$, $A_6$, $A_7$, $A_{10}$, $A_{11}$, $A_{14}$, $A_{15}$, etc. and in the individual positions the fabric element positioned on the needle $A_2$ is worked further such, as it is shown in connection with the following high foot needles.

FIG. 5 shows a bracket which points to the showing in FIG. 3. Within the range of this bracket, the fabric as shown in FIG. 3 is to be seen as follows. From the plate needles, which produce the side A of the fabric, the needles $A_4$ and $A_5$ carry a loop 1 each, the needles $A_6$ and $A_7$ a double-threaded loop 5, the needles $A_8$ and $A_9$ each a loop 1 and the needles $A_{10}$ and $A_{11}$ a double-threaded loop 5, just exactly the loops which are shown on the side A of the fabric in FIG. 3.

The cylinder needles $B_4$ to $B_{11}$ carry the double-threaded loops of the side B of the fabric, shown in FIG. 3.

A view of the entire FIG. 5 brings about the following result:

Loops 7a formed each of two threads are suspended from the cylinder needles $B_1$ to $B_8$ and single-threaded loops 1 and two-threaded loops 5, respectively, are suspended from the plate needles $A_1$ to $A_{10}$. For the purpose of a better showing it is assumed, that these loops are already produced. It will be now described how the following loops are created. The already finished loops have been formed in the same manner.

A thread 3′ is inserted into the needle cross by a known thread guide, which is not shown in FIG. 5 for the purpose of better demonstration. In the shown state, the thread 3′ is disposed on the advanced needles $B_5$ and $B_6$ between the hook and the flap. The thread 3′ rests on the needles $A_7$ to $A_{10}$, depending how far these needles have been withdrawn already, either between the hook and the flap (needle $A_7$) or behind the flap (needles $A_8$ and $A_9$), or already in the hook closed by the flap (needle $A_{10}$), and in particular in the case of the needle $A_{10}$, because it was disposed previously on this needle between the flap and the hook. If the thread 3′ is set between the flap and the hook, a loop is formed therefrom. If, however, the thread 3′ is set behind the flap, a tuck loop is formed therefrom. The aim, that the thread 3′ is set between the flap and the hook and behind the flap, respectively, is obtained such, that the high foot needles, as shown in FIG. 6b and the low foot needles, as shown in FIG. 6c, respectively, are used. As it can be ascertained from FIGS. 5, 6a and 6e, the high foot needle $A_7$ is partly withdrawn if the fed thread 3' is pulled from the needle $B_7$ over the needle $A_7$, thus assumes a position on the needle $A_7$ between its flap 21 and hook 20. On the other hand, the thread 3' has been set on the needle $B_8$ as it was in this position, in which the needle $B_7$ is shown, over the needle $A_8$, as the latter was in this position, in which the needle $A_7$ is shown, behind the flap 21', because the needle $A_8$ has been completely advanced.

FIGS. 6a and 6b show a plate lock segment 52, which comprises the lock cover 53 and the lock parts 54, 55, 56, 57 and 58, which define a channel 59, which is of a depth, that the feet 51 of the high foot needles 50 can travel therein. The lock part 55 is lower than the other lock parts, so that it forms a branch channel 60, in which, due to its low depth, only low foot needles 50' can travel with their feet 51'. In the case that the lock part 55 is not used for the formation of a branch channel 60, it is adjustable in vertical direction of the machine, that means perpendicular to the plane of the drawing of FIG. 6a or in FIG. 6b in horizontal direction such, that its bottom face is disposed in the same plane with the bottom faces of the other lock parts. It can be ascertained from the arrangement of the channel 59 in FIG. 6a, how the needles are controlled, whereby the arrangement of the channel 59 in downward direction amounts to an advance of the needles, the arrangement of the channel 59 in upward direction a withdrawal of the needles and the arrangement of the channel 59 in horizontal direction a rest position of the needles relative to the radial movement thereof. The lock part 57 is a sinking eccentric, which is slidable in radial direction relative to the axis of the circular knitting machine, as it is indicated by a double-arrow 61, whereby the length of the loop can be adjusted.

FIGS. 6e and 6f show a cylinder lock segment 62, which comprises a lock plate 63 and the lock parts 64, 65, 66 and 67, which define a channel 68. Since only one type of needles is used here as cylinder needles, namely low foot needles 50', it is of no importance, how deep the channel is, rather it will suffice, if the feet 51' of the low foot needles can travel therethrough. The lock part 65 is a sinking eccentric adapted for the adjustment of the length of the loop, which is adjustable in vertical direction, as the double arrow 69 in FIG. 6e indicates.

In the state disclosed in FIG. 5, the needles $A_1$, $A_4$, $A_5$, $A_8$ and $A_9$ are those, which have formed tuck loops 4 and a one-threaded loop 1, while tuck loops 4' and one-threaded loops 1' are formed and have been formed, respectively, on the needles $A_{12}$ and $A_{13}$. The needles $A_2$, $A_3$, $A_6$, $A_7$ and $A_{10}$ are those, which have formed two-threaded loops 5, while two-threaded loops 5' are formed and have been formed, respectively, on the needles $A_{10}$, $A_{11}$, $A_{14}$ and $A_{15}$.

Since the binding thread 3' is gripped, as disclosed above, from the cylinder needle $B_7$ by its hook and is set over the plate needle $A_7$, and in particular between the flap and the hook of the latter, and is gripped by the cylinder needle $B_8$ by means of its hook and is set over the plate needle $A_8$, and in particular behind the flap of the latter, the operation is performed as follows:

(1) Side A of the fabric, high foot needles

The high foot needles are transferred from the position of the needles $A_6$ and $A_7$ (FIG. 5), which are disposed in a half-advanced position in the portion 59d of the channel of the plate lock 52 (FIG. 6a) successively into the positions of the needles $A_{10}$, $A_{11}$, $A_{14}$ and $A_{15}$ and in the next system into the positions of the needles $A_2$ and $A_3$. As already mentioned, on the needle $A_7$ a double-threaded loop 5 is disposed behind the flap, which loop 5 consists of the thread 2 and the binding thread 3, and on the flap, the binding thread 3'. The needle $A_7$ is then withdrawn by passing the channel part 59e and reaches then the position of the needle $A_{10}$. Prior to reaching this position, the thread 2' is set next to the thread 3' by means of a thread guide, which is not shown for the purpose of better demonstration, thus onto the flap of the needle $A_7$. When the needle $A_7$ reaches the position of the needle $A_{10}$, the double-threaded loop 5 has reached the flap and closed the same, whereby the threads 2' and 3' slide into the hook. In the position of the needle $A_{11}$, the loop 5 has slipped down, that means, did slide over the needle and the threads 2' and 3', which are disposed in the hook, form a new loop 5'.

The flap has opened again at the needle $A_{11}$ by conventional means. The loop 5' remains on its needle as long until in the next system the position of the needle $A_{10}$ is reached again. This is shown by the needles $A_{14}$ and $A_{15}$ and in the next system those needles would show that, which corresponds to the needles $A_2$, $A_3$, $A_6$, $A_7$ of the system shown in FIG. 5.

(2) Side A of the fabric, low foot needles

The low foot needles move from the position of the needle $A_8$ (FIG. 5), which is disposed on its return movement in the channel part 59h of the plate lock 52 (FIG. 6a), successively into the positions of the needles $A_9$, $A_{12}$, $A_{13}$ and move in the next system into those positions which correspond to the needles $A_1$, $A_4$ and $A_5$ in the shown system. On the needle $A_8$ is disposed a loop 1 of the thread 2 and a tuck loop of the thread 3'. Furthermore, the new thread 2' has been set on the needle $A_8$ upon setting on the high foot needles, and in particular between the flap and the hook. The needle $A_8$ moves then, since it moves in the channel part 59h (FIG. 6a), into the position of the needle $A_9$. There the flap has been closed by means of the tuck loop pre-formed by the thread 3', so that the thread 2' is disposed in the hook. During further withdrawal of the low foot needles by passing the channel part 59e, the completely withdrawn position $A_{12}$ is reached. Here, the loop 1 and the tuck loop 4' formed of the thread 3' did slide down already from the needle and the flap, which has been rendered free by these parts, has opened again. The new loop 1' formed of the thread 2' is still suspended in the hook. This new loop 1' remains on the needle until in the next system again the position of the needle $A_8$ is reached, however, the loop 1' is transferred in the next system by the displacement of the low foot needles, as shown by the needles $A_1$, $A_4$ and $A_5$ in the shown system from the hook behind the flap.

(3) Run of the plate needles

It results from the above statements that all plate needles in each system, one of which is disclosed in FIGS. 6a and 6b, are advanced in the channel part 59a. In the channel part 59b, all needles remain in the most forward position. Then, the path of the high foot needles separates temporarily from that of the low foot needles. The feet 51 of the high foot needles 50 are withdrawn in the channel part 59c partly and remain in this position during the passing of the channel part 59d. The low foot needles 50', which have a lower foot 51' than the high foot needles, pass the channel part 59g and are withdrawn thereafter through the channel part 59h to an extent that they resume again the position, in which the high foot needles 50 are disposed in the channel part 59d. Thereafter, both types of needles are completely withdrawn through the channel part 59e and pass the channel part 59f, which continues in the next system, as is indicated in FIG. 6a on the left side for the shown system.

(4) Side B of the fabric

Here only equal needles are used, for instance, low foot needles 50' in accordance with FIG. 6c. On the needles $B_1$ to $B_6$ are disposed double-threaded loops 7a, which are formed of the thread 7 and the binding thread 3

(FIG. 5). By displacement of these needles from the channel part 68a through the channel part 68b into the channel part 68c (FIG. 6e) each loop 7a, which is disposed at first between the flap and the hook of each needle (needle $B_1$) is moved behind the flap (needles $B_1$ to $B_6$). The needle $B_7$ catches with its hook the new binding thread 3' adapted for the forming of new double-threaded loops 7a', and which is fed, as stated above, at this position, by withdrawing the needle $B_7$ by means of guiding its foot 51' in the channel part 68d. During this withdrawal of the needle $B_7$, the loop 7a suspended on the needle behind the flaps starts to close the flap. During the return of the needle $B_7$ into the position of the needle $B_8$, the hook catches also the new thread 7', which, as stated above, is fed thereto in this position, which thread 7' is thus inserted between the flap and the hook. The needle $B_8$ holds also in its hook the threads 3' and 7' and on its closed flap 6 also the loop 7a. The needle $B_9$ is completely withdrawn, its foot 51' is disposed in the channel part 68e. Accordingly, the loop 7a is thrown off and the new loop 7a' is disposed in the hook, which loop 7a' is formed of the threads 3' and 7'. Since the following needles $B_{10}$ to $B_{16}$ are in resting position, because their feet 51' pass the channel part 68e, nothing happens on the side B of the fabric. Only in the next system that occurs, which has been explained above in connection with the needles $B_1$ to $B_6$ for the shown system. Then the cycle starts again, as has been explained above for the needles $B_7$ and the following needles.

It is now apparent, that the fabric in accordance with FIGS. 1 and 2 can be produced in the same manner, only with the exception that the thread 7 is omitted.

In the fabric disclosed in FIG. 3, the covered thread is disposed outside and the binding thread 3 is disposed inside in the double-threaded loops of the side B of the fabric. It can be also arranged in opposite manner. Which thread is disposed on the outside and which thread is disposed on the inside is dependent upon the feeding of the threads. In FIGS. 5a and 5b, the upper part of a cylinder needle is disclosed, and in particular, of the cylinder needle $B_8$ of FIG. 5. If, as shown in FIG. 5a, the covered thread 7' is inserted into the hook closer to the needle shaft than the binding thread 3', the covered thread 7' is disposed on the outside in the finished loop, and the binding thread 3' is disposed on the inside. If, however, as it is shown in FIG. 5b, the binding thread 3' is inserted into the hook closer to the needle shaft than the covered thread 7', then the binding thread 3' is disposed on the outside in the finished loop.

It is apparent from FIG. 5 that the covered thread 7' is inserted closer to the needle shaft than the binding thread 3' in connection with the needle $B_8$, which binding thread 3' is already disposed in the hook. Also, in the finished fabric, the covered thread must be disposed on the outside, as shown in FIG. 3.

The effect, whether the binding thread or the covered thread should be disposed on the inside or on the outside, can be obtained such, that the thread guide (not shown) for the covered thread 7' is displaced correspondingly, and in particular in known manner.

Figure 8:
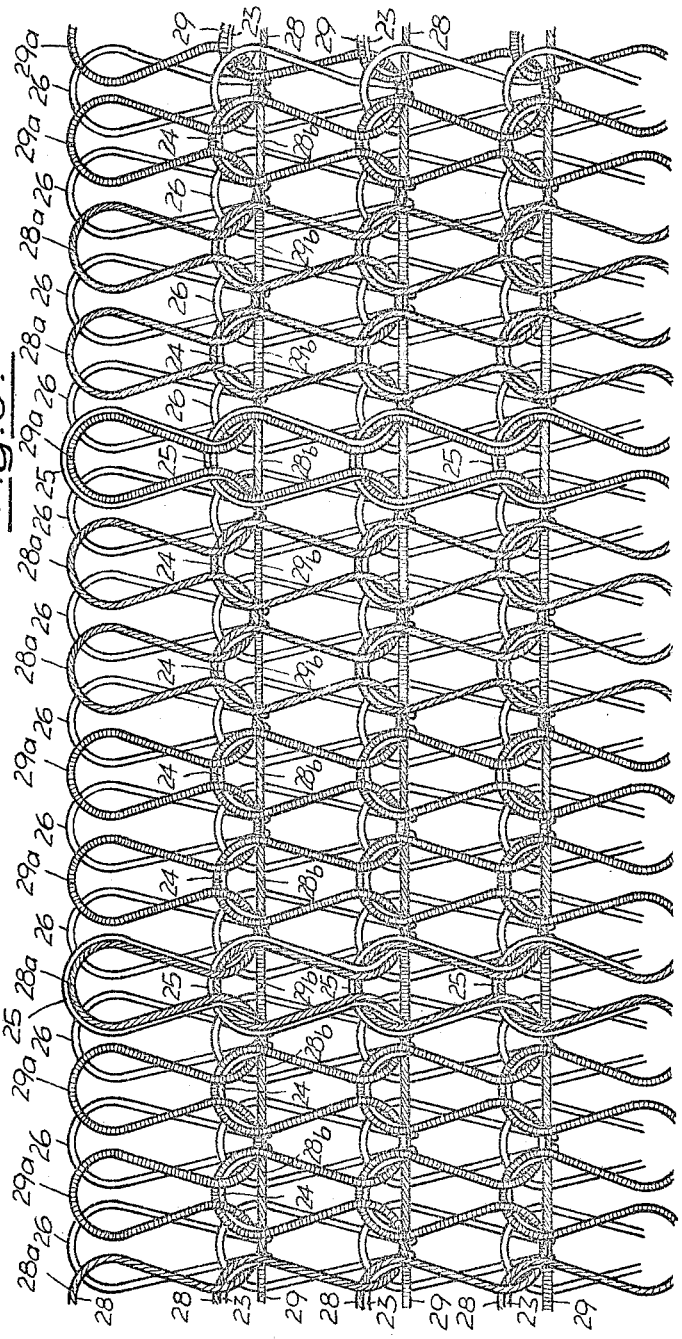
FIG. 8 shows a view of the fabric as shown in FIG. 7.

FIG. 9 shows schematically the production of a fabric according to FIGS. 7 and 8 on a circular knitting machine with a rotary direction of cylinder and plate in accordance with the arrow 27, and in particular in a predetermined position, whereby in FIG. 9 the needles are disclosed as wound up from the periphery of the cylinder and of the plate and the individual loops are spread apart, in order to clarify the showing.

Figure 10A:
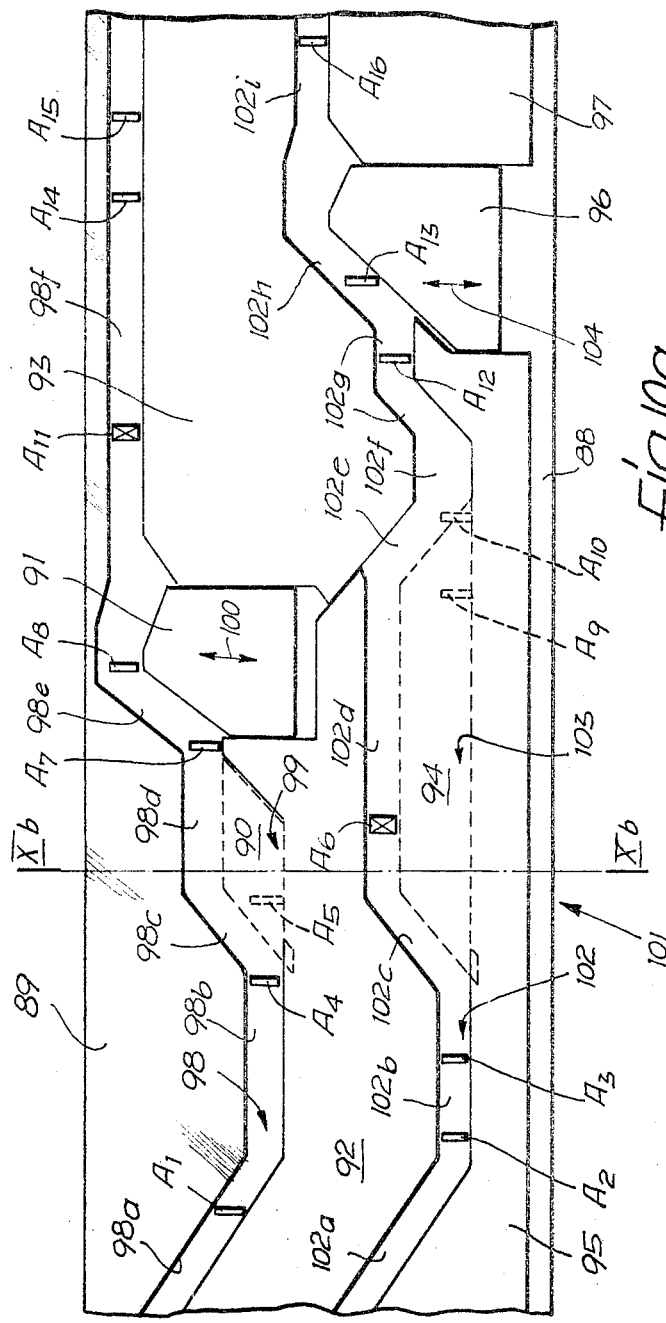

FIGS. 10a and 10g show a plate lock system and a cylinder lock system, respectively, of a circular knitting machine for the manufacture of a knitted fabric according to FIGS. 7 and 8. FIGS. 10b and 10h show section along the lines Xb—Xb of FIG. 10a and Xh—Xh of FIG. 10g, respectively. FIGS. 10c, 10d, 10e and 10f show needles, which are used in the plate of the knitting machine.

As with the needles, which are used for the production of the fabric in accordance with FIGS. 3 and 4, high foot needles and low foot needles are required, however, two series of each, namely high foot needles according to FIG. 10c, which have a high foot 80 near the end of their shaft 81, low foot needles according to FIG. 10d, which have a low foot 82 near the end of their shaft 83, high foot needles according to FIG. 10e, which have a high foot 84 at about the center of the length of their shaft 85, and low foot needles in accordance with FIG. 10f, which have a low foot 86 at about the center of the length of their shaft 87.

All these needles have in conventional manner, as can be ascertained from FIGS. 10c, 10d, 10e and 10f, a flap 200h 200t, 202h and 202t, respectively, and a hook 201h, 201t, 203h and 203t, respectively.

In FIGS. 10a and 10g, the low foot needles are shown symbolically by a rectangle and the high foot needles by a rectangle with a cross inserted therein.

As can be ascertained from FIGS. 10a and 10b, the plate lock 101 comprises a lock cover 88, on which is disposed, on the one hand, a lock part 89, and, on the other hand, lock parts 92, 90, 91 and 93, which define a channel 98 and due to the fact that the lock part 90 is lower than the other lock parts, define a branch channel 99. The lock part 91 is a sinking eccentric, which is movable in radial direction relative to the axis of the knitting machine, as is indicated by the double arrow 100, and which serves the setting of the length of the loops. In the plate lock 101, a second channel 102 is formed in the same manner, namely, on the one hand, by the lock parts 92 and 93 and, on the other hand, by the lock parts 95, 94, 96 and 97. Since the lock part 94 is lower than the other lock parts, a branch channel 103 is defined. The lock part 96 is a sinking eccentric displaceable in the direction of the double arrow 104. Those high foot needles and low foot needles run in the channel 98, which have their foot next to the end of the shaft (FIGS. 10c and 10d). In the channel 102 run those high foot needles and low foot needles, which have their foot about in the center of the length of their shaft (FIGS. 10e and 10f).

If the needles of equal length in accordance with FIGS. 10c, 10d, 10e and 10f are disposed next to each other such, that the blunt needle ends and the hooks cover each other, then the feet 80 and 82 have the same distance from the feet 84 and 86 as the channel parts 98f and 102i are spaced apart from each other.

As FIGS. 10g and 10h indicate, the cylinder lock 105 comprises a lock plate 106, on which are disposed the lock parts 107, 108 and 109, on the one hand, and a lock part 110, on the other hand, which define a channel 111. The lock part 108 is a sinking eccentric, displaceable in the direction of the double arrow 112, thus parallel to the axis of the knitting machine. For the cylinder lock 105 according to FIGS. 10g and 10h, only one type of needles is used, which can be, for instance, high foot needles, which have their foot near the end of their shaft.

In FIG. 9 a bracket is shown, which relates to the showing in FIG. 7. On the needles, covered by the bracket shown in FIG. 9, a section of the fabric is suspended, as it is shown in FIG. 7.

In particular, there are suspended:

on the needle $A_3$ a loop 28a formed of the thread 28,
on the needles $A_4$ and $A_5$ a loop 29a each formed of the thread 29,
on the needle $A_6$ a double-threaded loop, which is formed by a loop 28a of the thread 28 and a loop 25 formed of the binding thread 23,
on the needle $A_7$ a loop 29a formed of the thread 29,
on the needle $A_8$ a loop 29a' formed of the thread 29',
on the needles $A_9$ and $A_{10}$ a loop 28a each formed of the thread 28, on the needle $A_{11}$ a double threaded loop $25a'$, $29a'$, which comprises a loop $25'$ formed of the thread 23 and a loop $29a'$ formed of the thread $29'$, on the needles $A_{12}$ and $A_{13}$ a loop $28a$ each formed of the thread 28, on the needles $A_{14}$ and $A_{15}$ a loop $29a'$ formed of the thread $29'$, on the needles $B_4$ to $B_6$ a loop 26 each formed of the thread 23, on the needles $B_7$ to $B_{15}$ a loop $26'$ each formed of the binding thread $23'$.

The numerals of the above-stated listing differ from those in FIG. 7 only by the fact that the different threads and loops carry the index "'", which merely indicates that a new thread has been fed thereto, which cannot be shown in FIG. 7. The high foot needles $A_6$ and $A_{11}$ are indicated by a shading.

For reasons of a clear showing, it is now assumed, (1) that on the needles $A_1$, $A_4$ and $A_5$ a loop $29a$ is already suspended behind the flap, which loop $29a$ is formed of a sample thread 29, (2) that on the needles $A_2$ and $A_3$ is suspended already a loop $28a$ behind the flap, which loop $28a$ is formed of the sample thread 28, (3) that on the high foot needle $A_6$ a double-threaded loop 25, $28a$ is suspended behind the flap, which double-threaded loop is formed of the thread 28 and the binding thread 23, (4) that on the needles $B_1$ to $B_5$ one loop each is suspended behind the flap, which loop 26 is formed of the binding thread 23.

The needle $A_1$ is in the state of advancing and with its foot in the channel part $98a$. The needle $A_4$ is disposed with its foot in the channel part $98b$, and is thus in the most advanced position. The same applies also for the needle $A_5$, since the latter has a low foot 82 and can, therefore, pass the lower lock part 90 in the channel part 99 formed by the latter.

The needles $A_2$ and $A_3$ have passed the channel part $102a$ and are in their forwardmost position, namely with their feet 86 in the channel part $102b$. The needle $A_6$, which has a high foot 84, is already returned from its forwardmost position through the channel part $102c$ into a median position, in which its foot is disposed in the channel part $102d$.

From the cylinder needles, which all have an equally high foot, the needles $B_1$, $B_2$ and $B_3$ have passed already in their forward movement the channel part $111a$ and are with their feet in the channel part $111b$, thus in their forwardmost position. The needles $B_4$ and $B_5$ are on the return stroke namely with their feet in the channel part $111c$.

It should be remarked here that the needles $A_1$, $A_4$, $A_5$, $A_7$, $A_8$, $A_{11}$, $A_{14}$ and $A_{15}$ work the sample threads 29 and $29'$, while the needles $A_2$, $A_3$, $A_6$, $A_9$, $A_{10}$, $A_{12}$, $A_{13}$ and $A_{16}$ work the sample threads 28 and $28'$. All these needles work in addition the binding threads 23 and $23'$. The threads 23, 28 and 29 have already been fed and worked in the previous system, and in particular, in the same manner, as it is described below for the threads $23'$, $28'$ and $29'$. Due to the fact that one group of plate needles works the sample threads 29 and $29'$, the other group the sample threads 28 and $28'$, the parts $28b$ and $29b$ are created (FIGS. 7, 8 and 9).

In view of the above described condition, the following takes place:

The binding thread $23'$ is fed by means of a known thread guide, which is not shown for the purpose of better demonstration, such that it can be caught by the hook of the cylinder needle $B_5$, which is in its return stroke, on which a loop 26 fed from the previous system and formed of the binding thread 23 behind the flap being suspended from the cylinder needle $B_5$, which loop 26 is just about to close the flap, because, due to the return stroke of the needle $B_5$, the latter slides towards the flap. In the next step the binding thread $23'$ is already set over the plate needles $A_5$ and $A_6$ and has been gripped between the latter from the hook of the returning cylinder needle $B_6$, the flap of which thereafter has been closed from the forwardly sliding loop 26. While the binding thread $23'$ is disposed on the needle $A_5$ behind the flap, which needle $A_5$ is in its forwardmost position, the binding thread is disposed on the high foot needle $A_6$ between the flap and the hook, which high foot needle $A_6$ is in its median position.

A sample thread $29'$ is fed by means of a known thread guide, which is not shown for the purpose of a better demonstration, such that it is inserted over the needles $A_4$ and $A_5$ between the flap and the hook. As soon as the needle $A_5$ has reached the position of the needle $A_7$, due to passing of the channel part 99, thus assumes a median position, the loop $29a$ and the thread $23'$ did slide forwardly on the needle $A_7$ as much that the thread $23'$ has closed the flap, while the thread $29'$ is in the hook. The loop $29a$ and the thread $23'$ have been thrown off the needle $A_8$, which has returned due to its passing of the channel part $98e$ into its rearmost position, whereby the thread $23'$ has been formed to a tuck loop $24'$. The loop $29a'$ is suspended from the hook and the flap has opened again due to the return stroke of the needle.

Nothing has been changed concerning the needles $A_{14}$ and $A_{15}$ relative to the needle $A_8$.

Relative to the needles $A_2$ and $A_3$, a change has occurred concerning the needles $A_9$, $A_{10}$ and $A_{12}$, since the binding thread $23'$ has been set by means of the needles $B_9$ to $B_{13}$ behind the flap of the needles $A_9$, $A_{10}$ and $A_{12}$ and forms a tuck loop $24'$.

By means of a further thread guide, a new sample thread $28'$ has been set between the flap and the hook of the needles $A_9$, $A_{10}$ and $A_{12}$. The needle $A_{12}$ is in its return stroke, since it just entered the channel part $102g$ from the channel part $102f$, so that the binding thread $23'$ just starts to close the flap.

In the position of the needle $A_{13}$, which further in its return stroke, namely which is disposed with its foot in the channel part $102h$, the binding thread $23'$ has closed the flap. In the position of the needle $A_{16}$, which is disposed in the channel $102i$, and thus is in the completely withdrawn position, the loop $28a$ and the tuck loop $24'$ are thrown off, while the loop $28a'$ is disposed in the hook and the flap is opened again.

The high foot needle $A_6$ is of a type, which forms double-threaded loops 25, $28a$ from the binding thread 23 and the sample thread 28. Its work can be only partly determined from FIG. 9, because it cannot be shown at those points, at which the other needles are shown. The operation of the high foot needle $A_6$ can be determined, however, from FIG. 10a. It is apparent that the high foot needle $A_6$ is advanced again after the position shown in FIG. 9, since its foot must enter from the channel part $102d$ through the channel part $102e$ into the channel part $102f$. By such arrangement, practically no change takes place concerning the double-threaded loop 25, $28a$ and the tuck loop $24'$. Only when the foot of the high foot needle $A_6$ reaches the channel part $102g$, thus has assumed about the position of the needle $A_{12}$, the thread $28'$ lies on the needle between the flap and the hook. If now the high foot needle $A_6$, due to passing of the channel part $102h$, returns into its rearmost position, in which its foot is disposed in the channel part $102i$, then the flap is closed by means of the advancing loop 25, $28a$, and the thread $23'$ and the thread $28'$ are in the hook, and the loop 25, $28a$ is thrown off. In the next system, the cycle starts again, whereby then a loop formed of the threads $23'$ and $28'$ is disposed behind the flap, as the double-threaded loop 25, $28a$ on the high foot needle $A_6$ shown in FIG. 9.

Concerning the high foot needle $A_{11}$, a corresponding procedure takes place. In the position shown in FIG. 9, the needle $A_{11}$ has thrown off the double-threaded loop 25, 29a, which is formed of the binding thread 23 and the thread 29, and a new double-threaded loop 25', 29a' is in the hook, which new double-threaded loop is formed of the threads 23' and 29'. The high foot needle $A_{11}$ was prior to reaching the position shown in FIG. 9, due to the passing of the channel part 98a, the channel part 98b and the entering into the channel part 98c, advanced and has been withdrawn again, so that it had in the position of the needle $A_5$ about a position, in which it was not as far advanced as the needle $A_5$, but was more advanced than the needle $A_7$. In such position, the threads 23' and 29' could be inserted between the flap and the hook of the needle $A_{11}$. Then, due to the passing of the channel parts 98d and 98e, thus due to the return of the high foot needle $A_{11}$, the flap has been closed by the loop 25, 29a disposed behind the flap, this loop has been thrown off and thereafter, due to the return of the needle in the channel part 98f, the flap has been opened again, so that the position of the high foot needle $A_{11}$ in FIG. 9 resulted.

Concerning the plate needles, which work only the binding thread 23', it has been stated already that a loop 26 formed of the binding thread 23 in the previous system is suspended behind the flap on the needles $B_1$, $B_2$ and $B_3$. These plate needles $B_1$, $B_2$ and $B_3$ are disposed with their foot in the channel part 111b (FIG. 10g), thus in their forwardmost position. Due to the passing of the channel part 111c, the needles are withdrawn, as is shown by the needles $B_4$, $B_5$ and $B_6$. The new binding thread 23' is caught, thereby, with the hook and the flap is closed by the forward moving loop 26. In the position of the needle $B_7$, which is completely withdrawn, because its foot reached the channel part 111d, the loop 26 is thrown off and the flap is opened again. In this position, the plate needles remain, as is shown by the needles $B_8$ to $B_{16}$, until the channel part 111d is passed and in the next system the needles reach during the passing of a channel part corresponding to the channel 111a (FIG. 10g) in a position as is shown by the needles $B_1$ to $B_3$, whereupon the cycle starts again.

In similar manner as the fabric in accordance with FIGS. 7 and 8, variations in accordance with FIGS. 11 and 12 can be produced, only with the difference that still a covered thread is inserted. The numerals applied in FIG. 11 are increased over the corresponding numerals of FIGS. 7 and 8 by 10, and the numerals of FIG. 12 are increased by 20. FIG. 11 discloses a covered thread 37 and FIG. 12 a covered thread 47. These covered threads are inserted below the plate needles, so that each of these threads can only be gripped by the cylinder needles.

The insertion takes place by means of an additional thread guide in positions, which correspond with the positions of the needles $B_3$, $B_4$ and $B_5$ of FIG. 9, where also the binding thread 33 and 43, respectively, is inserted, and in particular between the flap and the hook. FIGS. 11 and 12 differ merely by the fact that in FIG. 11 the binding thread 33, which forms the loops 36, is disposed on the outside of the fabric, however, the covered thread 37, which forms the loops 37a, is disposed on the inside. In FIG. 12, the covered thread 47, which forms the loops 47a, is on the outside, while the binding thread 43, which forms the loops 46, is disposed on the inside. All loops on the side B of the fabric of FIGS. 11 and 12 are double-threaded loops.

Whether in the double-threaded loops of the side B of the fabric the binding thread or the covered thread is on the outside, depends on the feeding of the threads, an expedient already described above in connection with FIGS. 5, 5a and 5b.

Preferably, the binding thread has a thickness of up to approximately 1/15 of the thickness of at least one of the other threads.

While I have disclosed several embodiments of the present invention, it is to be understood that these embodiments are given by example only and not in a limiting sense, the scope of the present invention being determined by the objects and the claims.

I claim:
1. A double-faced knitted fabric, comprising
at least two threads,
one of said two threads constituting a first thread forming ground loops on one side of said fabric,
the other of said two threads constituting a second thread forming ground loops on the other side of said fabric,
one of said threads forming a binding thread interlacing said ground loops of both sides of said fabric to form tuck loops hung over a plurality of said ground loops of the other of said threads and to form plain loops forming double loops with the others of said ground loops of the other of said threads, said tuck loops and said plain loops being formed in any predetermined pattern.

2. A double-faced knitted fabric comprising
three threads,
one of said three threads constituting a first thread forming ground loops on one side of said fabric,
another of said three threads constituting a second thread forming ground loops on the other side of said fabric,
still another of said three threads constituting a third thread forming double-loops with said ground loops of said first thread and forming a binding thread interlacing said ground loops of both sides of said fabric to form tuck loops hung over said ground loops of said second thread and to form plain loops, both in any predetermined pattern.

3. The knitted fabric, as set forth in claim 2, wherein
said first thread faces toward the outside in said double-loops.

4. The knitted fabric, as set forth in claim 2, wherein
said binding thread faces toward the outside in said double-loops.

5. A double-faced knitted fabric, comprising
at least three threads,
at least two of said three threads forming pattern threads and forming ground loops alternately on one side of said fabric,
each of said pattern threads forming loops bridging said ground loops of at least one of the other of said pattern threads,
and the third of said three threads forming ground loops on the other side of said fabric and
forming a binding thread interlacing said ground loops of both sides of said fabric to form tuck loops hung over a plurality of said ground loops of said pattern threads and to form plain loops forming double loops with the others of said ground loops of said pattern threads, said tuck loops and said plain loops being formed in any predetermined pattern.

6. The double-faced knitted fabric, as set forth in claim 5, wherein
an additional plating thread is knitted together with said binding thread to form double-loops on the side not containing said pattern threads.

7. The double-faced knitted fabric, as set forth in claim 6, wherein
said plating thread faces toward the outside in said double-loops.

8. The double-faced knitted fabric, as set forth in claim 6, wherein
said binding thread faces toward the outside in said double loops.

9. The knitted fabric, as set forth in claim 1, wherein
said binding thread has a thickness of up to approximately 1/15 of the thickness of at least one of said other threads.

References Cited by the Examiner

UNITED STATES PATENTS 1,386,444  8/1921  Stibbe _____ 66—196 X

FOREIGN PATENTS 1,281,621  12/1961  France.
394,219  4/1924  Germany.
948,003  9/1956  Germany.
950,955  10/1956  Gremany.
350,821  6/1931  Great Britain.
970,863  9/1964  Great Britain.

OTHER REFERENCES

German application 1,083,476, Pfrommer, June 1960.

DONALD W. PARKER, *Primary Examiner.*

RUSSELL C. MADER, *Examiner.*

W. C. REYNOLDS, *Assistant Examiner.*